United States Patent
Driscoll et al.

(10) Patent No.: US 9,027,075 B2
(45) Date of Patent: May 5, 2015

(54) ENFORCING SECURITY RULES AT RUNTIME

(75) Inventors: James Driscoll, Santa Clara, CA (US); Shailesh Vinayaka, Los Gatos, CA (US); Steven P. Muench, Padova (IT)

(73) Assignee: Oracle International Corporation, Redwood Shores, CA (US)

( * ) Notice: Subject to any disclaimer, the term of this patent is extended or adjusted under 35 U.S.C. 154(b) by 643 days.

(21) Appl. No.: 13/328,728

(22) Filed: Dec. 16, 2011

(65) Prior Publication Data

US 2013/0086625 A1 Apr. 4, 2013

Related U.S. Application Data

(60) Provisional application No. 61/540,656, filed on Sep. 29, 2011.

(51) Int. Cl.
*G06F 7/04* (2006.01)
*G06F 21/52* (2013.01)
*G06F 21/54* (2013.01)
*G06F 9/45* (2006.01)

(52) U.S. Cl.
CPC ................ *G06F 21/52* (2013.01); *G06F 21/54* (2013.01); *G06F 8/40* (2013.01)

(58) Field of Classification Search
CPC ........... G06F 8/40; G06F 8/427; G06F 8/437; G06F 8/447; G06F 9/00; G06F 9/20145; G06F 9/20192; G06F 9/20196; G06F 9/445; G06F 9/44521; G06F 9/44578; G06F 9/44589; G06F 9/45504; G06F 9/45516; G06F 9/4552; G06F 9/45525; G06F 21/00; G06F 21/50; G06F 21/52; G06F 21/54; G06F 21/56; G06F 21/563; G06F 21/566; G06F 21/70; G06F 21/71; G06F 27/73; G06F 2221/2125
USPC ............ 726/1, 22, 26, 30; 717/110, 114, 118, 717/126, 130, 136, 141, 143, 144, 146–148, 717/154, 158; 709/203
See application file for complete search history.

(56) References Cited

U.S. PATENT DOCUMENTS 6,148,402 A * 11/2000 Campbell ........................ 726/10
6,282,702 B1 * 8/2001 Ungar ............................ 717/148
6,516,416 B2 2/2003 Gregg et al.

(Continued)

OTHER PUBLICATIONS

MacDonald, David "Groovy AST Transform to inject Spring Security Check for Java Caller" [Online], Sep. 12, 2011 [Retrieved on Jul. 4, 2014], www.ohnoes-nz.blogspot.com, Retrieved from: <http://ohnoes-nz.blogspot.com/2011/09/this-post-follows-on-with-trend-of.html>.*

(Continued)

*Primary Examiner* — Saleh Najjar
*Assistant Examiner* — Eric W Shepperd
(74) *Attorney, Agent, or Firm* — Kilpatrick Townsend & Stockton LLP (57) ABSTRACT

Various arrangements for implementing a security policy at runtime are presented. A plurality of calls in a syntax tree may be identified. Each call of the plurality of calls may be substituted with a corresponding security-modified call to create a plurality of security-modified methods calls. Each security-modified call may be linked with a security class. Following modification of each call of the plurality of calls, the plurality of security-modified calls may be compiled into bytecode.

20 Claims, 8 Drawing Sheets

(56) References Cited

U.S. PATENT DOCUMENTS

| | | | |
|---|---|---|---|
| 7,171,693 B2* | 1/2007 | Tucker et al. | 726/26 |
| 7,287,243 B2* | 10/2007 | Dollin et al. | 717/126 |
| 7,290,288 B2 | 10/2007 | Gregg et al. | |
| 7,624,385 B2* | 11/2009 | Waddington et al. | 717/143 |
| 7,945,958 B2* | 5/2011 | Amarasinghe et al. | 726/25 |
| 8,332,828 B2* | 12/2012 | Vargas | 717/137 |
| 8,418,135 B2* | 4/2013 | Proctor et al. | 717/117 |
| 8,601,453 B2* | 12/2013 | Gennard et al. | 717/146 |
| 8,627,303 B2* | 1/2014 | Adams et al. | 717/159 |
| 8,677,141 B2* | 3/2014 | Erlingsson et al. | 713/187 |
| 2009/0193497 A1* | 7/2009 | Kikuchi et al. | 726/1 |
| 2009/0222792 A1* | 9/2009 | Shanbhogue et al. | 717/111 |
| 2011/0173597 A1* | 7/2011 | Cascaval et al. | 717/148 |
| 2011/0239307 A1* | 9/2011 | Joffray et al. | 726/26 |
| 2011/0313981 A1* | 12/2011 | Ben-Natan | 707/694 |
| 2013/0067441 A1* | 3/2013 | Lafreniere et al. | 717/139 |

OTHER PUBLICATIONS

MacDonald, David "Groovy Logging Injection—AST Transformation", Sep. 16, 2011, [Retrieved on Jul. 4, 2014], www.ohnoes-nz.blogspot.com, Retrieved from: <http://ohnoes-nz.blogspot.com/2011/09/groovy-logging-injection-ast.html>.*

Alex et al., "Spring Security 3.0.8.Release Reference Documentation" [Online], Mar. 15, 2004 [Retrieved on: Dec. 9, 2014], Spring [www.spring.io], Retrieved from: <http://docs.spring.io/spring-security/site/docs/3.0.x/reference/springsecurity-single.html>.*

Champeau, C., "Customizing Groovy compilation process," Cedric Champeau's Weblog, May 12, 2011, [retrieved on May 1, 2012], 5 pages. Retrieved from: http://jroller.com/melix/entry/customizing_groovy_compilation_process.

* cited by examiner

ENFORCING SECURITY RULES AT RUNTIME

CROSS-REFERENCES

This application claims priority from U.S. Provisional Patent Application No. 61/540,656, filed Sep. 29, 2011, entitled "Enforcing Security Rules at Runtime," which is hereby incorporated by reference, as if set forth in full in this document, for all purposes.

BACKGROUND

Some programming languages, such as GROOVY, compile code into bytecode that is configured to be interpreted by a virtual machine into machine code. Some such languages may allow for the code being compiled to be modified at one or more stages during the compilation process. During the compilation process, a syntax tree may be created based on the code being compiled. In a programming language, such as GROOVY, this syntax tree may be modified before the bytecode is created.

SUMMARY

Various arrangements for implementing a security policy at runtime are presented. A method for implementing a security policy at runtime may be presented. The method may include identifying, by a computer system, a plurality of calls. The method may include modifying, by the computer system, each call of the plurality of calls with a corresponding security-modified call to create a plurality of security-modified calls. Each security-modified call may be linked with a security class. The method may include, following modification of each call of the plurality of calls, compiling, by the computer system, the plurality of security-modified calls.

Embodiments of such a method may include one or more of the following: The method may include executing, by the computer system, bytecode. Compiling the plurality of security-modified calls may result in creation of the bytecode. Executing the bytecode may comprise executing a security-modified method of the plurality of security-modified calls; checking for permission for a call corresponding to the security-modified method; and, based on a result of checking for permission for the call corresponding to the security-modified method, executing the call, wherein the result indicates executing the call is permissible. Executing the bytecode may include: executing a security-modified method of the plurality of security-modified calls; checking for permission for a call corresponding to the security-modified method; and based on a result of checking for permission for the call corresponding to the security-modified method, blocking execution of the call, wherein the result indicates executing the call is impermissible. The method may include receiving, by the computer system, uncompiled code from a second computer system. The method may include creating, by the computer system, a syntax tree based on the uncompiled code received from the second computer system, wherein the plurality of calls are identified from the syntax tree. The method may include executing, by the computer system, bytecode, wherein compiling the plurality of security-modified calls results in creation of the bytecode. Identifying the plurality of calls may include identifying the plurality of calls from a syntax tree. Modifying each call of the plurality of calls may include modifying each call of the plurality of calls in the syntax tree with the corresponding security-modified call. Compiling the plurality of security-modified calls may include compiling the syntax tree. The method may include, prior to substituting each call of the plurality of calls, analyzing the syntax tree for impermissible constructors. The uncompiled code may be in a programming language that permits editing of the syntax tree. The programming language may be GROOVY.

A computer program product residing on a non-transitory processor-readable medium for implementing a security policy at runtime may be presented. The computer program product may include computer-readable instructions configured to cause a computer to identify a plurality of calls. The computer program product may also include computer-readable instructions configured to cause the computer to modify each call of the plurality of calls with a corresponding security-modified call to create a plurality of security-modified calls. Each security-modified call may be linked with a security class. The computer program product may also include computer-readable instructions configured to cause the computer to, following modification of each call of the plurality of calls, compile the plurality of security-modified calls.

Embodiments of such a computer program product may include one or more of the following: The computer program product may further comprise computer-readable instructions configured to cause the computer to execute bytecode, wherein compiling the plurality of security-modified calls results in creation of the bytecode. The computer-readable instructions configured to cause the computer to execute the bytecode may comprise computer-readable instructions to cause the computer to: execute a security-modified method of the plurality of security-modified calls; check for permission for a call corresponding to the security-modified method; and based on a result of checking for permission for the call corresponding to the security-modified method, execute the call, wherein the result may indicate executing the call is permissible. The computer-readable instructions configured to cause the computer to execute the bytecode may comprise computer-readable instructions to cause the computer to: execute a security-modified method of the plurality of security-modified calls; check for permission for a call corresponding to the security-modified method; and based on a result of checking for permission for the call corresponding to the security-modified method, block execution of the call, wherein the result indicates executing the call is impermissible. The computer program product may further comprise computer-readable instructions configured to cause the computer to: receive uncompiled code from a second computer system; and create a syntax tree based on the uncompiled code received from the second computer system, wherein the plurality of calls are identified from the syntax tree. The computer program product may further comprise computer-readable instructions configured to cause the computer to execute bytecode, wherein compiling the plurality of security-modified calls results in creation of the bytecode.

Embodiments of such a computer program product may also include one or more of the following: The computer-readable instructions configured to cause the computer to identify the plurality of calls may comprise computer-readable instructions configured to cause the computer to identify the plurality of calls from a syntax tree. The computer-readable instructions configured to cause the computer to modify each call of the plurality of calls may comprise computer-readable instructions configured to cause the computer to modify each call of the plurality of calls in the syntax tree with the corresponding security-modified call. The computer-readable instructions configured to cause the computer to compile the plurality of security-modified calls may comprise computer-readable instructions configured to cause the computer to compile the syntax tree. The computer program product may further comprise computer-readable instructions configured to cause the computer to, prior to substituting each call of the plurality of calls, analyze the syntax tree for impermissible constructors. The uncompiled code may be in the GROOVY programming language.

A system for implementing a security policy at runtime may be presented. The system may include a computer system. The computer system may comprise a processor. The computer system may also comprise a memory communicatively coupled with and readable by the processor and having stored therein processor-readable instructions. When executed by the processor, the processor-readable instructions may cause the processor to identify a plurality of calls. The processor-readable instructions may also cause the processor to modify each call of the plurality of calls with a corresponding security-modified call to create a plurality of security-modified calls. Each security-modified call is linked with a security class. The processor-readable instructions may also cause the processor to, following modification of each call of the plurality of calls, compile the plurality of security-modified calls.

BRIEF DESCRIPTION OF THE DRAWINGS

A further understanding of the nature and advantages of various embodiments may be realized by reference to the following figures.

DETAILED DESCRIPTION

The ability to modify code during the compilation process may be useful for security purposes. In some situations, it may be possible for a user, using a user computer, to provide code to a remote server for compiling and, possibly, execution. As such, the user may be creating and/or modifying code that is to be executed by a second computer system that the user may not necessarily be administratively responsible for (e.g., the second computer system is maintained by a third-party). A security arrangement, such as the JAVA Security-Manager (JSM), may allow for security rules to be implemented that check for permission for various methods of (JAVA) code to be executed. However, if unsecured code has already been written, such an implementation of JSM may require the code to be modified. Such a task may be significant. For example, if a large number of application programming interfaces (APIs) are already coded that require security, the amount of modification necessary to be made to the code of the APIs may be substantial. Rather than recoding the unsecured code, it may be possible to implement security that can be "overlayed" onto the unsecured code during the compilation process with security being monitored at runtime in addition to a static analysis occurring during compilation.

Using a programming language that allows for modification of the syntax tree during the compilation process may allow for one or more security rules (referred to herein as a security policy) to be implemented. As an example, a user may submit code to a server from a remote computer system for compilation and execution. This server may be operated by a third-party that is distinct from the user; as such, the third-party may desire to enforce a security policy that prevents certain actions from being performed by the user's code. As an example of a prohibited action, to prevent an accidental or malicious action of the user, a security policy may be enforced to block execution of code that modifies the server's file system. While the code submitted by the user may not contain security functions, the server may modify method calls in a syntax tree based on the code supplied by the user. Once the syntax tree has been created based on the code, an analysis of the syntax tree may be performed. This analysis, which may be referred to as static analysis, may be used to identify various methods, constructor access, and/or property access that are strictly prohibited in accordance with the security policy. (In some programming languages, property access calls may be indistinguishable from field access; however, there may be a distinction in other programming languages.) Such violations of the security policy may prevent the code from being compiled into bytecode and may result in an exception being output. An indication of the exception may be provided to the user.

If the code passes static analysis, some or all method calls, property access calls, and/or constructor access calls may be associated with a security class. This may be accomplished by "wrapping" each such instance with a reference to the security policy class. As such, each method present in the syntax tree may be substituted with a security class that maintains the original method as a parameter (this modified method call is referred to herein as a "security-modified method"). The security policy class may be responsible for enforcing the security policy at runtime by checking a security policy for permission to execute the method call being passed as a parameter.

Once some or all of the method calls, property access calls, and/or constructor access calls have been modified, the syntax tree containing the security-modified methods may be compiled into bytecode. As such, the code provided by the user may be compiled as modified at the syntax tree level such that method calls, property access calls, and constructor access calls are linked with the security policy class. When the bytecode is executed, rather than the method calls, property access calls, and/or constructor access calls being executed directly, the security policy class may be first used to provide a determination of whether the wrapped function is permissible or impermissible, as defined by the security policy. If permitted, the method call, property access call, or constructor access call, as originally coded in the uncompiled code received from the user, may be executed. If blocked, the bytecode may be halted from being executed and an exception may be generated.

While the above description focuses on code provided by a user for execution on a remote server, it should be understood that this is for example purposes only. Such an implementation of a security policy may be performed for other reasons, based on code received either locally or from a remote source.

Such an implementation of a security policy at runtime may be performed using GROOVY, or some other programming language that permits access to the syntax tree during the compiling process before bytecode (or machine code) has been generated.

GROOVY is an object-oriented programming language for the JAVA platform. Generally, GROOVY is a superset of JAVA. As such, JAVA code may likely be syntactically valid in GROOVY. GROOVY includes additional syntax and features in addition to what is available in JAVA. Similar to JAVA, GROOVY code can be compiled into bytecode. This bytecode can be translated by a virtual machine into machine code. When GROOVY code is being compiled, prior to the bytecode being generated, a syntax tree may be created based on the code. While in the form of a syntax tree, it may be possible to edit the syntax tree before the bytecode is created. As such, various modifications may be made to the syntax tree that will affect creation of the bytecode and how the bytecode will execute at runtime. While the ensuing description focuses on GROOVY as the programming language, it should be understood that similar principles may be applied to another programming language that allows for editing of code at the syntax tree level prior to compiling into bytecode (or machine code) being performed.

Figure 1:
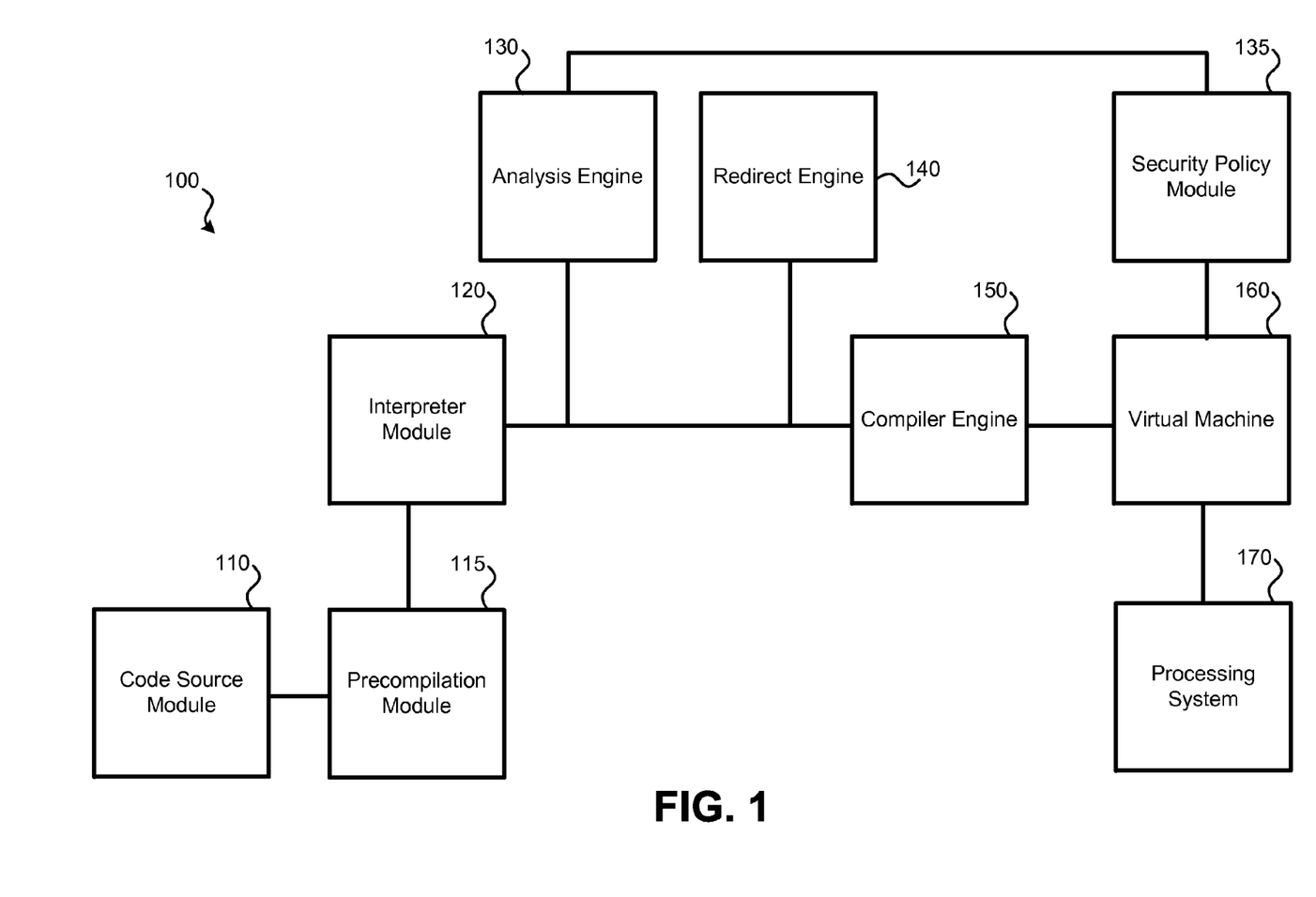
FIG. 1 illustrates a block diagram of an embodiment of a system configured to enforce a security policy at runtime.

FIG. 1 illustrates a block diagram of an embodiment of a system 100 configured to compile code and enforce a security policy at runtime. System 100 may comprise computer software, firmware, and/or hardware. System 100 may comprise a computer system, such as computer system 800 of FIG. 8. System 100 comprises various modules, each of which may be implemented using software, firmware, and/or hardware. Components include: code source module 110, precompilation module 115, interpreter module 120, analysis engine 130, security policy module 135, redirect engine 140, compiler engine 150, virtual machine 160, and processing system 170.

Code source module 110 may serve to receive code. This code may be written in a syntax of a programming language that, when compiled, may be edited at the syntax tree level. In some embodiments, code source module 110 may be configured to receive code from a remote computer system, such as code submitted via a web-based interface. Code source module 110 may serve to open a file containing code that is to be compiled.

Precompilation module 115 may complete part of a compilation process of the code received by code source module 110. In some embodiments, precompilation module 115 may insert one or more annotations to the code received by code source module 110 that serves to notify the compiler to call a manipulation class. For example, in GROOVY, such a manipulation class may be the GROOVY AST (abstract syntax tree) manipulation class. Different annotations may be necessary for different types of code. Interpreter module 120 may parse the code containing the annotations to create a syntax tree. The syntax tree created may be an abstract syntax tree. At this juncture, it may be possible in some programming languages to modify the syntax tree prior to bytecode being compiled.

Once interpreter module 120 has created a syntax tree and, possibly, added one or more annotations to the syntax tree referencing a manipulation class, analysis engine 130 may parse the syntax tree. Analysis engine 130 may perform a static analysis on the syntax tree to identify method calls, constructor calls, and/or property access calls collectively referred to as "calls" that are definitively prohibited by a security policy maintained by security policy module 135. If one or more method calls, constructor calls, and/or property access calls are always prohibited by security policy module 135, compilation to bytecode by compiler engine 150 may be prohibited. Further, an exception may be generated indicating the security violation. This exception may be stored and noted by the analysis engine 130 and/or the exception may be output to the user that supplied the uncompiled code to code source module 110.

If analysis engine 130 does not identify any method calls, constructor calls, and/or property access calls that are always prohibited by security policy module 135, redirect engine 140 may parse the syntax tree. Redirect engine 140 may substitute some or all method calls, constructor calls, and/or property access calls ("calls") of the syntax tree with a security class. This may involve each method call, constructor call, and/or property access call being modified to be associated with the security class. The original method call, constructor call, and/or property access call may remain embedded in the security-modified method calls, constructor calls, and/or property access calls. For example, the security class may be used to wrap each method call, constructor call, and/or property access call of the syntax tree. As such, the original method call, constructor call, and/or property access call may remain present as parameters of the security class call.

Compiler engine 150 may compile the modified syntax tree, which contains references to the security class, into bytecode. As such, the code received by code source module 110, as modified with the substitutions performed by redirect engine 140, is compiled by compiler engine 150.

Virtual machine 160 may execute the bytecode produced by compiler engine 150. For each method call, constructor call, and/or property access call that was security-modified by redirect engine 140, security policy module 135 may be consulted to determine if the corresponding method call, constructor call, and/or property access call, as defined in the code received by code source module 110, is permissible or impermissible. As such, each method call, constructor call, and/or property access call may be checked against the security policy before its execution. If the method call, constructor call, and/or property access call does not violate the security policy, the bytecode may be permitted to continue being executed. If not, the bytecode may be stopped and an exception may be generated. Such an exception may be output, such as to another system and/or a user.

Security policy module 135 may enforce a security policy, which includes one or more security rules. The security policy may be a default security policy or a customized security policy that defines various calls that are permitted or blocked from being performed. For example, the security policy may be in the form of a blacklist that defines various methods, classes, and properties that are not permitted to be performed. In some embodiments, a whitelist that defines various allowable properties, methods, and/or classes may be used. Since redirect engine 140 causes method calls, constructor calls, and/or property access calls to be directed to a security class, it may be possible to edit the security policy after compiler engine 150 has compiled code into bytecode, yet enforce the post-compilation modified security policy. The security policy stored and enforced by security policy module 135 may also be used by analysis engine 130 when a static analysis of the syntax tree is performed prior to compilation by compiler engine 150.

Virtual machine 160 may check with the security policy maintained by security policy module 135 for permission to execute all security-modified method calls, constructor calls, and/or property access calls. Virtual machine 160 may output machine code to processing system 170 for hardware-level execution.

Figure 2:
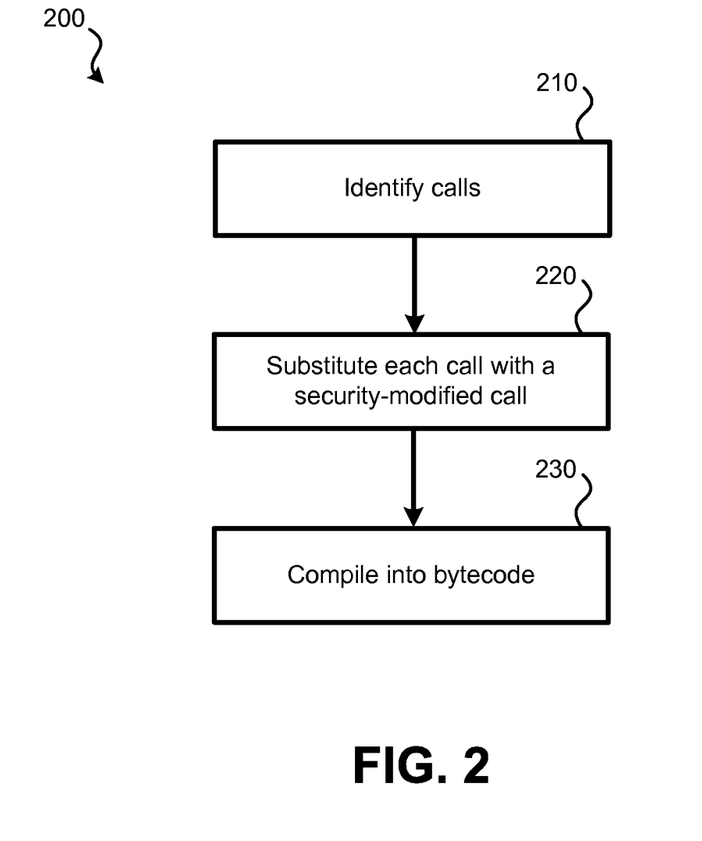
FIG. 2 illustrates an embodiment of a method for modifying code of a syntax tree during compilation.

System 100 may be used to perform various methods. FIG. 2 illustrates an embodiment of a method 200 for modifying code of a syntax tree during compilation. Method 200 may be performed by system 100. Method 200 may also be performed by some other form of system that is configured for modifying code of a syntax tree during compilation. Method 200 may be performed using one or more computer systems, such as computer system 800 of FIG. 8. Method 200 may involve the GROOVY programming language; it may also be possible to use other computer programming languages in conjunction with method 200. Programming languages that allow for the editing of a syntax tree during compiling may permit a similar method to be employed.

At step 210, method calls within a syntax tree may be identified. This syntax tree may be an abstract syntax tree that was created based on code written or otherwise provided by a user. This syntax tree may be created as part of the process of compiling the code. In some programming languages it is possible to edit code after the syntax tree has been generated. For example, compiling GROOVY code may allow for modification of code after a syntax tree has been generated but before bytecode has been generated. The user may have added one or more annotations to the code that indicate that one or more syntax tree manipulation classes should be called. In addition to identifying method calls, constructor calls and/or property access calls may be identified. Identification of method calls, constructor calls, and/or property access calls ("calls") may be accomplished by parsing the syntax tree.

At step 220, for each method call identified, a security-modified method call may be substituted. In addition to being for method calls, constructor calls and/or property access calls may also be substituted with security-modified constructor calls and/or security-modified property access calls. Substituting a security-modified call for a call may involve associating the call with a security class such that the security class is evaluated to determine whether permission is granted prior to the call being executed. For example, substituting a method call with a security-modified method call may involve the method call being wrapped in a security class call or otherwise modified so that the method call is checked against a security policy. The method call may become a parameter of the security class, thereby creating a security-modified method call. The method call may only be executed if the security check results in the method call being identified as permissible. As such, the security class that is based on a security policy will be checked for permission to perform the method call before the method call has been performed. Similar association and/or wrapping may occur for constructor calls and/or property access calls.

At step 230, following substitution, the syntax tree, which now may contain one or more security-modified method calls, security-modified constructor calls, and/or security-modified property access calls ("security-modified calls"), may be compiled. The compilation of the modified syntax tree may result in the creation of bytecode configured to be interpreted into machine code for execution. When executed, each security-modified call may be checked against the security policy using the security class. If one security-modified call fails to pass the security policy, the bytecode may cease being executed and an exception may be generated. The exception may be stored and/or output to a user. In some embodiments, it may be possible to skip the offending security-modified call and attempt to continue executing the bytecode.

Figure 3:
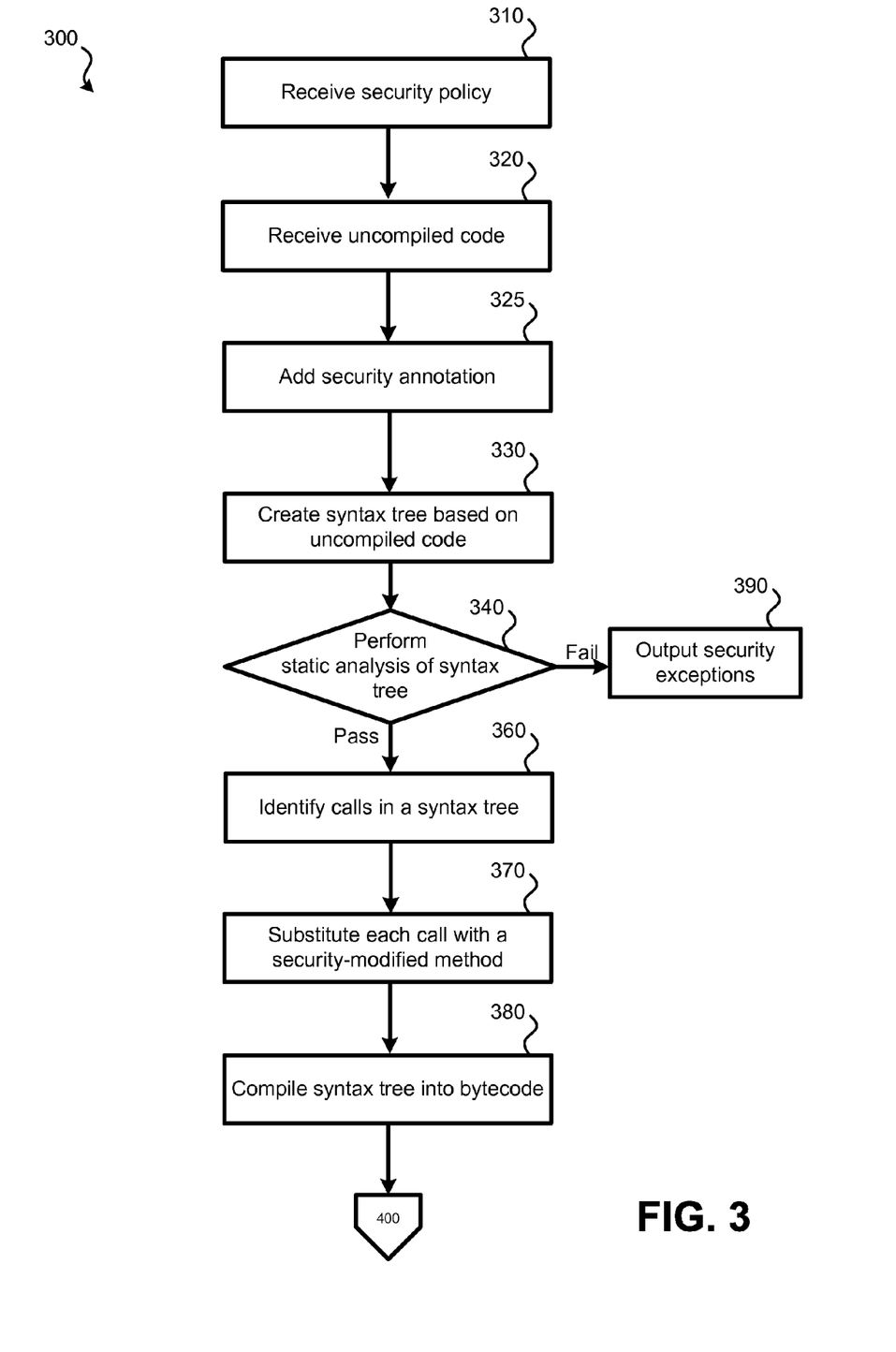
FIG. 3 illustrates another embodiment of a method for modifying code of a syntax tree during compilation.

FIG. 3 illustrates another embodiment of a method 300 for modifying code of a syntax tree during compilation. Method 300 may be performed by system 100. Method 300 may also be performed by some other form of system that is configured for modifying code of a syntax tree during compilation. Method 300 may be performed using one or more computer systems, such as computer system 800 of FIG. 8. Method 300 may represent a more detailed embodiment of method 200. Method 300 may involve the use of GROOVY programming language; however, it may be possible to use other computer programming languages in conjunction with method 300. Programming languages that allow for the editing of a syntax tree during compiling may permit a similar method to be employed.

At step 310, a security policy may be received. The security policy may contain one or more security rules. A security rule may identify a type of method call, constructor call, and/or property access call that is not permitted during execution of compiled code. This security policy may be a default security policy provided by or to the entity that is compiling code and/or may be a customized security policy. In some embodiments, custom security policy may be created, such as by modifying the default security policy The security policy may be stored by the system that is compiling code for execution. In some embodiments, the security policy may be stored remotely but may be accessible to the system that is compiling code for execution. As an example of a security policy, tables 1 and 2 may be used to define a blacklist of methods and classes that are impermissible. The blacklist of tables 1 and 2 may be incorporated as (part of) a default or customized security policy.

TABLE 1

| Always Restricted Methods | Restricted method names on static classes | Restricted method names on scripts |
|---|---|---|
| getClass | asSubclass | Evaluate |
| getMetaClass | cast | getBinding |
| wait | desiredAssertionStatus | getProperty |
| notify | forName | invokeMethod |
| notifyAll | getAnnotation | Run |
| | getAnnotations | setBinding |
| | getCanonicalName | setProperty |
| | getClasses | |
| | getClassLoader | |
| | getComponentType | |
| | getConstructor | |
| | getConstructors | |
| | getDeclaredAnnotations | |
| | getDeclaredClasses | |
| | getDeclaredConstructor | |
| | getDeclaredConstructors | |
| | getDeclaredField | |
| | getDeclaredFields | |
| | getDeclaredMethod | |
| | getDeclaredMethods | |
| | getDeclaringClass | |
| | getEnclosingClass | |
| | getEnclosingConstructor | |
| | getEnclosingMethod | |
| | getEnumConstants | |
| | getField | |
| | getFields | |
| | getGenericInterfaces | |
| | getGenericSuperclass | |
| | getInterfaces | |
| | getMethod | |
| | getMethods | |
| | getModifiers | |
| | getName | |
| | getPackage | |
| | getProtectionDomain | |
| | getResource | |
| | getResourceAsStream | |
| | getSigners | |

TABLE 1-continued

| Always Restricted Methods | Restricted method names on static classes | Restricted method names on scripts |
|---|---|---|
| | getSimpleName | |
| | getSuperClass | |
| | getTypeParameters | |
| | newInstance | |

TABLE 2

| Restricted Properties | Restricted properties on static classes |
|---|---|
| class | annotation |
| metaClass | annotations |
| | canonicalName |
| | classes |
| | classLoader |
| | componentType |
| | constructor |
| | constructors |
| | declaredAnnotations |
| | declaredClasses |
| | declaredConstructor |
| | declaredConstructors |
| | declaredField |
| | declaredFields |
| | declaredMethod |
| | declaredMethods |
| | declaringClass |
| | enclosingClass |
| | enclosingConstructor |
| | enclosingMethod |
| | enumConstants |
| | field |
| | fields |
| | genericInterfaces |
| | genericSuperclass |
| | interfaces |
| | method |
| | methods |
| | modifiers |
| | name |
| | package |
| | protectionDomain |
| | resource |
| | resourceAsStream |
| | signers |
| | simpleName |
| | superClass |
| | typeParameters |

At step 320, uncompiled code may be received. This code may be received in the form of a user writing code or providing one or more files containing code. In some embodiments, a user, via a user computer system, may submit code through a web-based interface to a remote server to be compiled and executed. The remote server may receive the uncompiled code, compile it, and execute the code remote from the user computer system. Code may be received from other sources besides a remote user computer system.

At step 325, one or more annotations may be added to the uncompiled code. The annotations may serve as an indication to the compiler that a manipulation class (such as GROOVY AST manipulation class) should be called. An annotation for script code (e.g., GROOVY script code) and/or an annotation for class code (e.g., GROOVY class code) may be added. Such annotations may be added manually by a user or automatically. If GROOVY is used, such annotations may be added as either global or local transformations, and may be triggered at the compilation step, which may be from the command line, or from a GROOVY API such as GroovyShell.parse( ). In some embodiments, instead of an annotation, some other triggering mechanism may be used, such as: a configuration switch, a properties file, or an environment variable.

At step 330, the uncompiled code may begin to be compiled. A first step of compilation may involve a syntax tree being created based on the uncompiled code received at step 320. Such an abstract syntax tree may be a tree representation of the uncompiled code received at step 320 written in a programming language, such as GROOVY. Each node of the syntax tree may correspond to an element in the uncompiled code. The programming language used for method 300 may permit editing of the syntax tree prior to the syntax tree being used to compile bytecode (or machine code).

At step 340, the security policy received at step 310 may be used to perform a static analysis of the syntax tree. Static analysis may be used to identify one or more constructor calls, method calls, and/or property access calls that will always violate the security policy (that is, are never permitted under the security policy). If one or more constructor calls, method calls, and/or property access calls fail to be permissible in accordance with the security policy, method 300 may proceed to step 390. At step 390, an exception may be generated and one or more exceptions may be output. For example, if the uncompiled code received at step 320 was received from a user via a web interface, the web interface may be used to provide the user with an indication of the one or more errors. Compiling of the syntax tree into bytecode may be blocked, at least until the security exceptions are corrected in the uncompiled code.

If the static analysis of step 340 does not identify any security exceptions in accordance with the security policy, method 300 may proceed to step 360. At step 360, calls within the syntax tree created at step 330 may be identified. This may include method calls, constructor calls, and/or property access calls. Identification of method calls, constructor calls, and/or property access calls may be accomplished by parsing the syntax tree.

At step 370, for each method call identified, a security-modified method call may be substituted. This may involve modifying the method call to be a security-modified method call. In addition to being for method calls, constructor calls and/or property access calls may also be substituted with security-modified constructor calls and/or security-modified property access calls, respectively. Substituting a security-modified method call for a method call may involve associating the method call with a security class such that the security class is evaluated to determine if the method call is permitted to be executed. The method call may only be executed if the security check results in the method call being identified as permissible. Substituting a method call with a security-modified method call may involve the method call being wrapped in a security class call. As such, the security class is used to check for permission to perform the method call before the method call has been performed. Similar association and/or wrapping may occur for constructor calls and/or property access calls. It should be understood that step 360 and step 370 may be performed together as a syntax tree is parsed. For example, a first method call may be identified and substituted with a security-modified method call before a second method call is identified.

Figure 4:
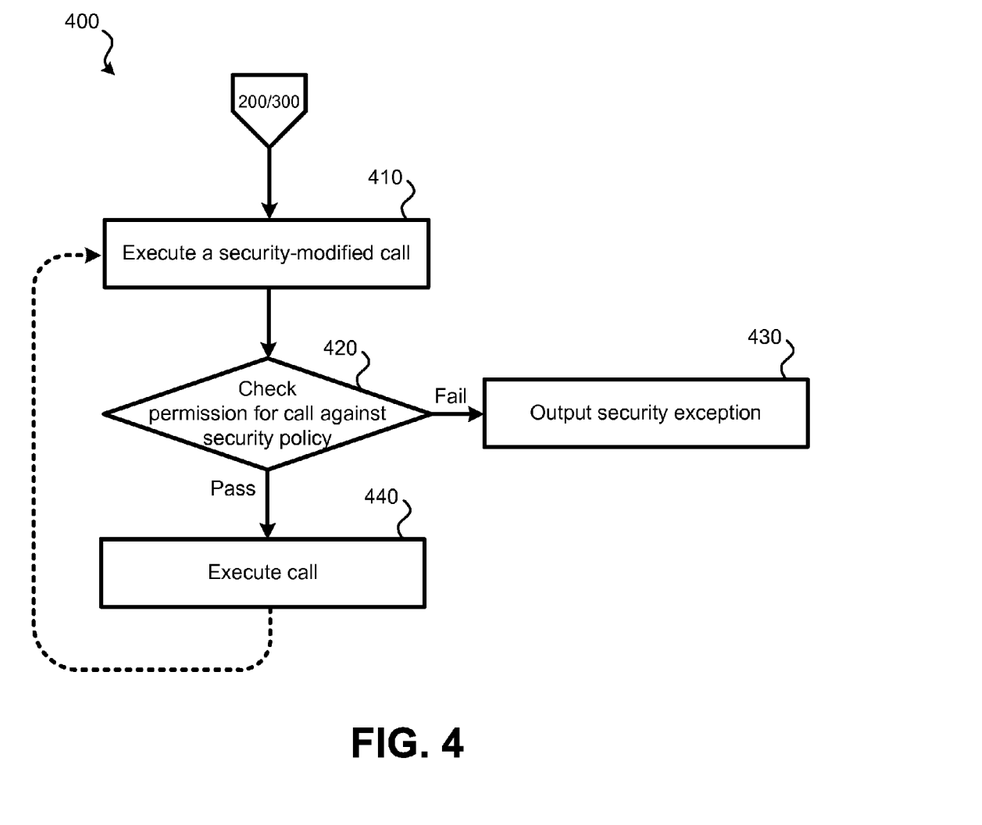
FIG. 4 illustrates an embodiment of a method for executing bytecode created using a syntax tree that was modified during compilation.

At step 380, following substitution being complete, the syntax tree, which now contains one or more security-modified method calls, security-modified constructor calls, and/or security-modified property access calls, may be compiled. The compilation of the modified syntax tree may result in bytecode configured to be interpreted by a virtual machine into machine code for execution. In some embodiments, machine code may be created directly by the compiler. Following step 380, creating the bytecode based on the uncompiled code received at step 320 may be complete. As indicated by the reference to method 400, method 300 may proceed to method 400 to execute the bytecode.

FIG. 4 illustrates an embodiment of a method 400 for executing bytecode created using a syntax tree that was modified during compilation. Method 400 may be performed by system 100. Method 400 may also be performed by some other form of system that is configured for executing compiled bytecode. Method 400 may be performed using one or more computer systems, such as computer system 800 of FIG. 8. Method 400 may represent a method for executing the bytecode created using method 300 or method 200. Method 300 may involve the GROOVY programming language; however, it may be possible to use other computer programming languages in conjunction with method 400. Programming languages that allow for the editing of a syntax tree during compiling may permit a similar method to be employed.

At step 410, a first security-modified call of the bytecode may be attempted to be executed. The call may be a security-modified method call, a security-modified constructor access call or a security-modified property access call. When executed, rather than directly executing the call, a security class associated with the call may be used.

At step 420, the security check for the security-modified call may be performed using the security class and policy. If the call fails to pass the security policy, method 400 may proceed to step 430. At step 430, a security exception may be generated. The bytecode may be prevented from being executed further. A user may be notified of the exception.

If the call satisfies the security policy, method 400 may proceed to step 440. At step 440, the call may be executed. As such, referring to method 300, if a first call was used to create a security-modified call at step 370, the first call may be executed at step 440 if the method call is in accordance with the security policy. Following successful execution of step 440, method 400 may return to step 410 when another security-modified call is executed. This may continue until the bytecode has completely been executed.

Figure 5:
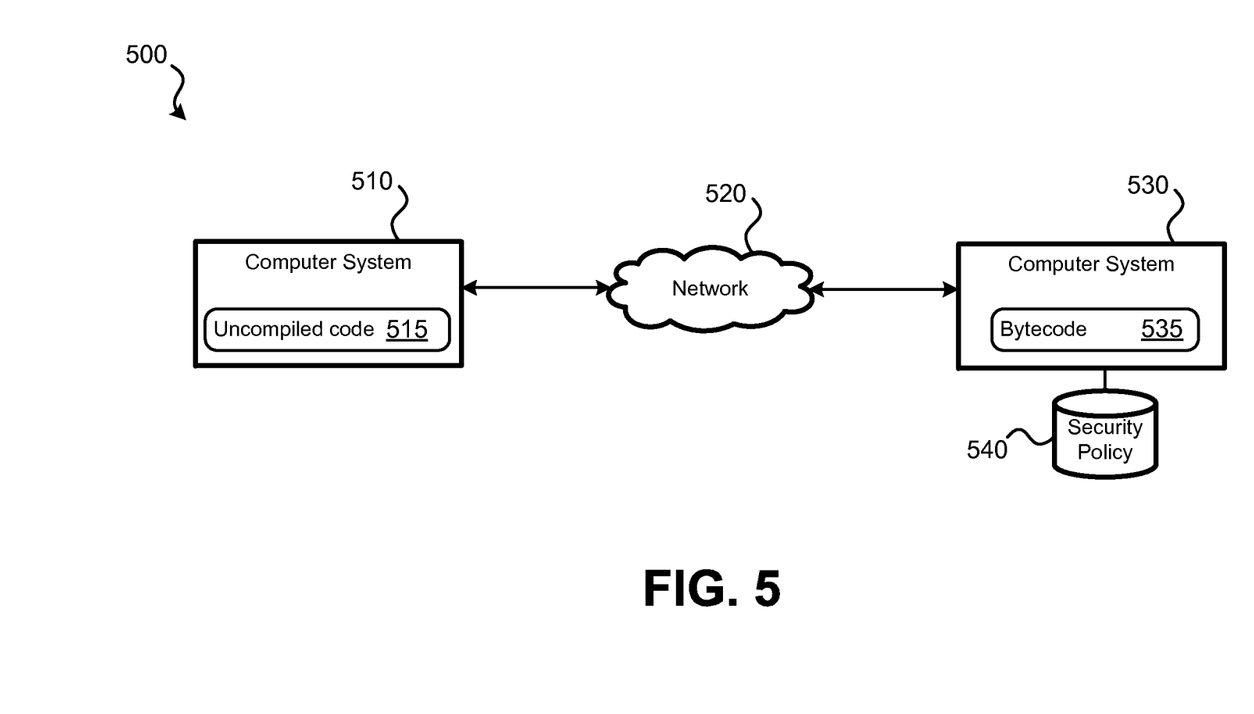
FIG. 5 illustrates an embodiment of a system configured to compile, modify, and execute code received from a remote computer system.

FIG. 5 illustrates an embodiment of a system 500 configured to compile, modify, and execute code received from a remote computer system. System 500 may include computer system 510, network 520, and computer system 530. Computer system 510, which may be an embodiment of computer system 800 of FIG. 8, may be a computer system operated by a user that desires to compile and execute code on a remote computer. This may be for several reasons, for example, the remote computer system, in this case computer system 530, may be faster and/or dedicated to the task of compiling and executing code. As such, by having computer system 530 perform the compiling process, computer system 510 may be left available to perform other tasks.

At computer system 510, uncompiled code 515 may be present. This uncompiled code may have been written by the user of computer system 510 or may be otherwise accessible to computer system 510. Uncompiled code 515 may be transmitted to computer system 530 via network 520. Network 520 may include one or more public and/or one or more private networks. A public network may be the Internet, and a private network may be a corporate intranet.

Computer system 530 may receive uncompiled code 515 from computer system 530. Computer system 530 may be an embodiment of computer system 800 of FIG. 8. Computer system 530 may have access to one or more security policies, such as security policy 540. Which security policy is used may be based on the user associated with computer system 510. Computer system 530 may use one or more methods as detailed herein to create bytecode 535 using uncompiled code 515 received from computer system 510. Such bytecode 535 may be compiled such that executing of calls within bytecode 535 is checked against security policy 540 prior to execution.

Figure 6:
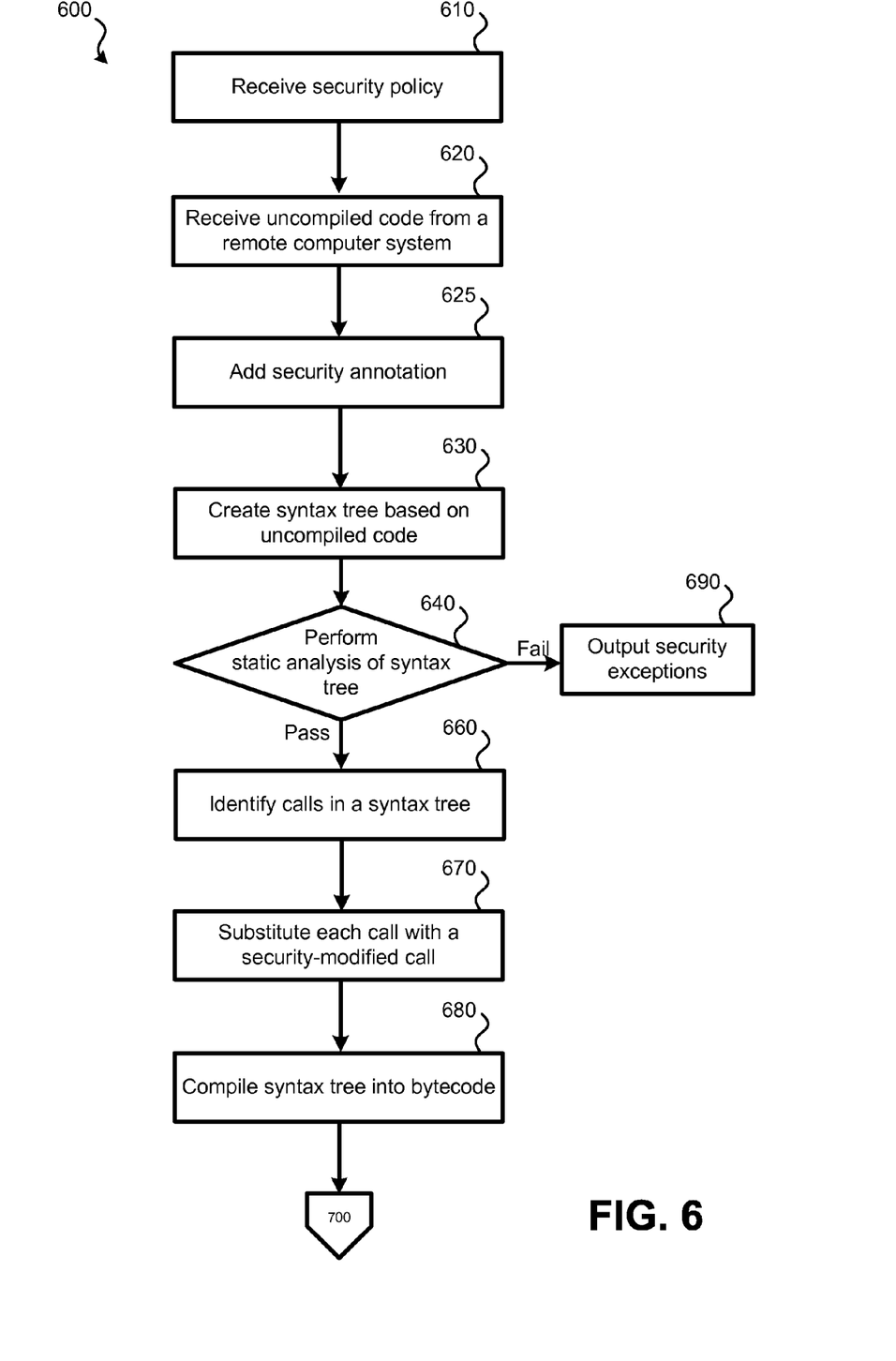
FIG. 6 illustrates another embodiment of a method for modifying code of a syntax tree during compilation received from a remote computer system.

FIG. 6 illustrates an embodiment of a method 600 for modifying code of a syntax tree during compilation received from a remote computer system. Method 600 may be performed by system 500 or some other system that permits uncompiled code to be received from a remote computer system for compilation and execution. Each step of method 600 may be performed by a computer system that is to compile and execute code received from a remote computer system. For example, each step of method 600 may be performed by computer system 530 of FIG. 5.

At step 610, the computer system may receive one or more security policies. The security policies may determine which calls within uncompiled code and bytecode are strictly forbidden, occasionally forbidden, and/or always allowed. Step 610 may correspond to step 310 of FIG. 3. At step 620, uncompiled code may be received from a remote computer system. Referring to FIG. 5, code may be received by computer system 530 from computer system 510, possibly via network 520. In some embodiments, computer system 530 may provide a web-based interface to computer system 510. Within this web-based interface, a user may be permitted to write (or otherwise supply) uncompiled code to computer system 530 for compilation and execution. Steps 625 through 680 correspond to steps 325 through 380 of method 300 of FIG. 3. At step 690, a record of any security exceptions generated may be stored by the computer system performing method 600 and/or may be transmitted to the computer system from which the uncompiled code was received.

Figure 7:
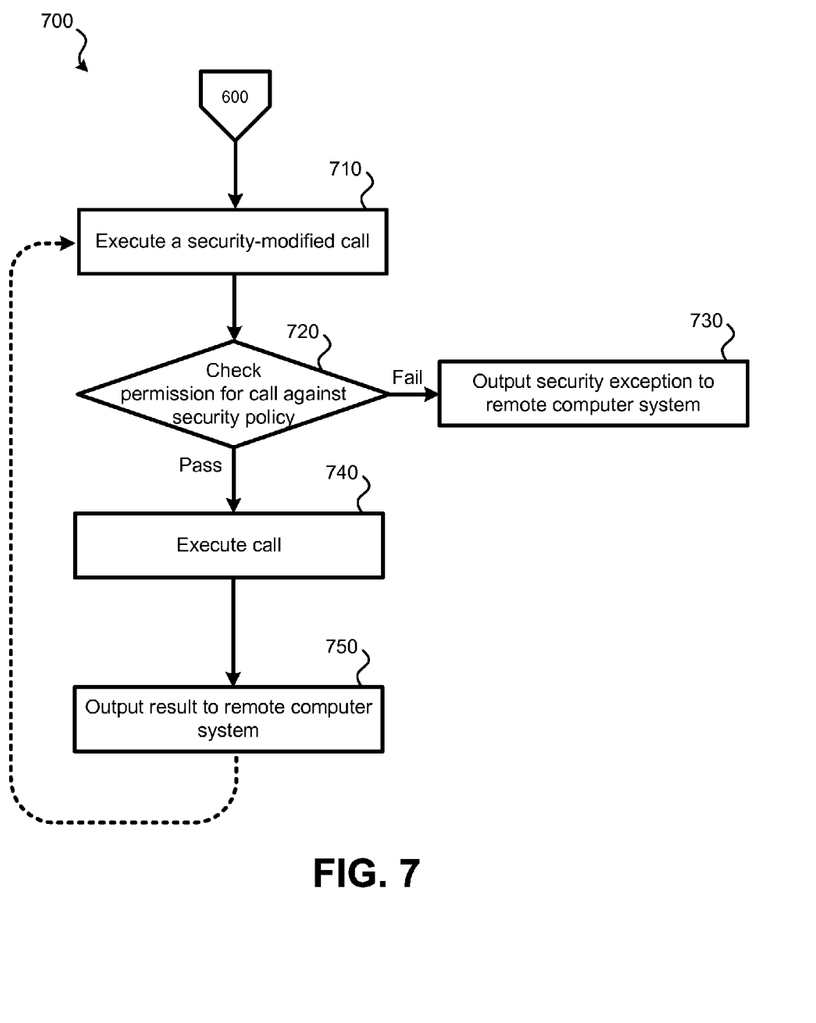
FIG. 7 illustrates an embodiment of a method for executing bytecode created using a syntax tree that was modified during compilation based on uncompiled code received from a remote computer system.

FIG. 7 illustrates an embodiment of a method 700 for executing bytecode created using a syntax tree that was modified during compilation based on uncompiled code received from a remote computer system. Method 700 may be performed by system 500. Method 700 may also be performed by some other form of system that is configured for executing compiled bytecode based on uncompiled code received from a remote computer system. Method 700 may be performed using one or more computer systems, such as computer system 800 of FIG. 8. Each step of method 700 may be performed by a computer system such as computer system 530 of FIG. 5. Method 700 may involve the GROOVY programming language; however, it may be possible to use other computer programming languages in conjunction with method 700. Programming languages that allow for the editing of a syntax tree during compiling may permit a method similar to method 700 to be employed.

Steps 710 and 720 correspond to steps 410 and 420 of method 400 of FIG. 4. At step 730, a security exception may be generated. The bytecode may be prevented from being executed further. A record of the exception may be stored by the computer system executing method 700. An indication of the security exception may be outputted to the remote computer system from which the uncompiled code was received, such as computer system 510 in system 500 of FIG. 5. Step 740 corresponds to step 440 of method 400.

At step 750, a result of an executed call may be output to the remote computer system. As such, the remote computer system may receive the results of the executed bytecode. An output to the remote computer system may only be provided for some executed calls. For example, not every executed call will result in the bytecode generating an output that may be transmitted to the remote computer system.

Figure 8:
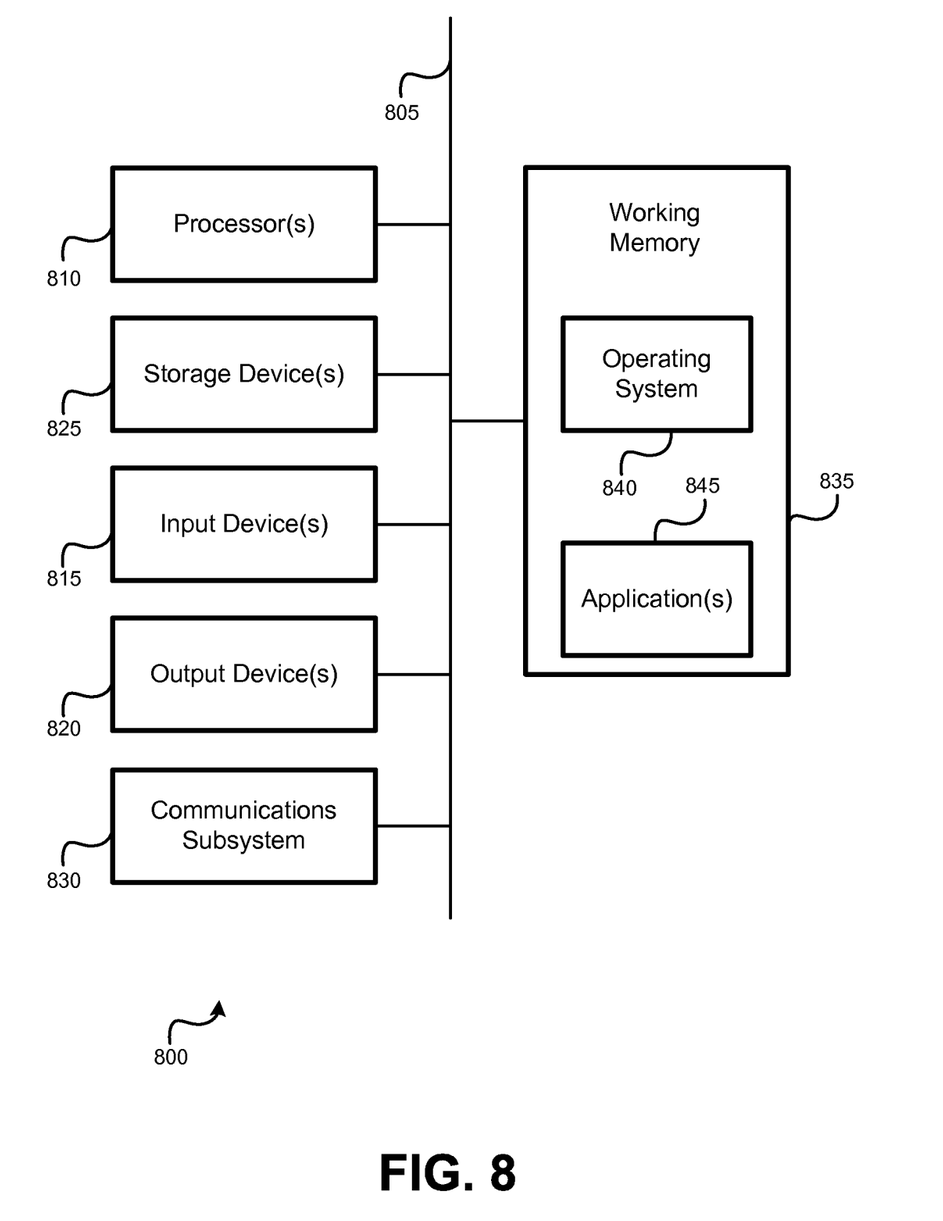
FIG. 8 illustrates an embodiment of a computer system.

FIG. 8 illustrates an embodiment of a computer system 800. A computer system as illustrated in FIG. 8 may be incorporated as part of the previously described computerized devices. For example, computer system 800 can represent some or all of the components/modules of system 100 of FIG. 1. FIG. 8 provides a schematic illustration of one embodiment of a computer system 800 that can perform the methods provided by various other embodiments, as described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800, and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for implementing a security policy at runtime, the method comprising:
   identifying, by a computer system, a plurality of calls;
   modifying, by the computer system, each call of the plurality of calls with a corresponding security-modified call to create a plurality of security-modified calls, wherein each security-modified call is linked with a security class that causes the plurality of security-modified calls to be compared to a security policy at a time of execution; and
   following modification of each call of the plurality of calls, compiling, by the computer system, the plurality of security-modified calls.

2. The method for implementing the security policy at runtime of claim 1, the method further comprising:
   executing, by the computer system, bytecode, wherein compiling the plurality of security-modified calls results in creation of the bytecode.

3. The method for implementing the security policy at runtime of claim 2, wherein executing the bytecode comprises:
   executing a security-modified method of the plurality of security-modified calls;
   checking for permission for a call corresponding to the security-modified method using the security policy; and
   based on a result of checking for permission for the call corresponding to the security-modified method, executing the call corresponding to the security-modified method, wherein the result indicates executing the call corresponding to the security-modified method is permissible.

4. The method for implementing the security policy at runtime of claim 2, wherein executing the bytecode comprises:
   executing a security-modified method of the plurality of security-modified calls;
   checking for permission for a call corresponding to the security-modified method using the security policy; and
   based on a result of checking for permission for the call corresponding to the security-modified method, blocking execution of the call corresponding to the security-modified method, wherein the result indicates executing the call corresponding to the security-modified method is impermissible.

5. The method for implementing the security policy at runtime of claim 1, further comprising:
   receiving, by the computer system, uncompiled code from a second computer system; and
   creating, by the computer system, a syntax tree based on the uncompiled code received from the second computer system, wherein the plurality of calls are identified from the syntax tree.

6. The method for implementing the security policy at runtime of claim 5, further comprising:
   executing, by the computer system, bytecode, wherein compiling the plurality of security-modified calls results in creation of the bytecode.

7. The method for implementing the security policy at runtime of claim 1, wherein:
   identifying the plurality of calls comprises identifying the plurality of calls from a syntax tree;
   modifying each call of the plurality of calls comprises modifying each call of the plurality of calls in the syntax tree with the corresponding security-modified call; and
   compiling the plurality of security-modified calls comprises compiling the syntax tree.

8. The method for implementing the security policy at runtime of claim 7, further comprising:
   prior to modifying each call of the plurality of calls, analyzing the syntax tree for impermissible constructors.

9. The method for implementing the security policy at runtime of claim 7, wherein uncompiled code is in a programming language that permits editing of the syntax tree.

10. The method for implementing the security policy at runtime of claim 9, wherein the programming language is GROOVY.

11. A computer program product residing on a non-transitor processor-readable medium for implementing a security policy at runtime, the computer program product comprising computer-readable instructions configured to cause a computer to:
    identify a plurality of calls;
    modify each call of the plurality of calls with a corresponding security-modified call to create a plurality of security-modified calls, wherein each security-modified call is linked with a security class that causes the plurality of security-modified calls to be compared to a security policy at a time of execution; and
    following modification of each call of the plurality of calls, compile the plurality of security-modified calls.

12. The computer program product of claim 11, wherein the computer program product further comprises computer-readable instructions configured to cause the computer to:
    execute bytecode, wherein compiling the plurality of security-modified calls results in creation of the bytecode.

13. The computer program product of claim 12, wherein the computer-readable instructions configured to cause the computer to execute the bytecode comprises computer-readable instructions to cause the computer to:
    execute a security-modified method of the plurality of security-modified calls;
    check for permission for a call corresponding to the security-modified method using the security policy; and
    based on a result of checking for permission for the call corresponding to the security-modified method, execute the call corresponding to the security-modified method, wherein the result indicates executing the call corresponding to the security-modified method is permissible.

14. The computer program product of claim 12, wherein the computer-readable instructions configured to cause the computer to execute the bytecode comprises computer-readable instructions to cause the computer to:
    execute a security-modified method of the plurality of security-modified calls;
    check for permission for a call corresponding to the security-modified method using the security policy; and
    based on a result of checking for permission for the call corresponding to the security-modified method, block execution of the call corresponding to the security-modified method, wherein the result indicates executing the call corresponding to the security-modified method is impermissible.

15. The computer program product of claim 11, wherein the computer program product further comprises computer-readable instructions configured to cause the computer to:
    receive uncompiled code from a second computer system; and
    create a syntax tree based on the uncompiled code received from the second computer system, wherein the plurality of calls are identified from the syntax tree.

16. The computer program product of claim 15, wherein the computer program product further comprises computer-readable instructions configured to cause the computer to:
    execute bytecode, wherein compiling the plurality of security-modified calls results in creation of the bytecode.

17. The computer program product of claim 11, wherein:
    the computer-readable instructions configured to cause the computer to identify the plurality of calls comprises computer-readable instructions configured to cause the computer to identify the plurality of calls from a syntax tree;
    the computer-readable instructions configured to cause the computer to modify each call of the plurality of calls comprises computer-readable instructions configured to cause the computer to modify each call of the plurality of calls in the syntax tree with the corresponding security-modified call; and
    the computer-readable instructions configured to cause the computer to compile the plurality of security-modified calls comprises computer-readable instructions configured to cause the computer to compile the syntax tree.

18. The computer program product of claim 17, wherein the computer program product further comprises computer-readable instructions configured to cause the computer to:
    prior to modifying each call of the plurality of calls, analyze the syntax tree for impermissible constructors.

19. The computer program product of claim 17, wherein uncompiled code is in the GROOVY programming language.

20. A system for implementing a security policy at runtime, the system comprising:
    a computer system, comprising:
        a processor; and
        a memory communicatively coupled with and readable by the processor and having stored therein processor-readable instructions which, when executed by the processor, cause the processor to:
            identify a plurality of calls;
            modify each call of the plurality of calls with a corresponding security-modified call to create a plurality of security-modified calls, wherein each security-modified call is linked with a security class that causes the plurality of security-modified calls to be compared to a security policy at a time of execution; and
            following modification of each call of the plurality of calls, compile the plurality of security-modified calls.

* * * * *

UNITED STATES PATENT AND TRADEMARK OFFICE
CERTIFICATE OF CORRECTION

| | | |
|---|---|---|
| PATENT NO. | : 9,027,075 B2 | Page 1 of 1 |
| APPLICATION NO. | : 13/328728 | |
| DATED | : May 5, 2015 | |
| INVENTOR(S) | : Driscoll et al. | |

It is certified that error appears in the above-identified patent and that said Letters Patent is hereby corrected as shown below:

Claims

In column 17, lines 7-8, in Claim 11, delete "non-transitor" and insert -- non-transitory --, therefor.

Signed and Sealed this
Ninth Day of February, 2016

Michelle K. Lee
*Director of the United States Patent and Trademark Office*